United States Patent [19]

Frandsen et al.

[11] Patent Number: 5,194,478
[45] Date of Patent: Mar. 16, 1993

[54] POLYMER COMPOSITION FOR SCAVENGING OXYGEN

[75] Inventors: Erik Frandsen, Odense; Rolando Mazzone, Asperup, both of Denmark

[73] Assignees: A/S Haustrup Plastic, Langeskov; A/S Haustrup PLM Holding, Odense, both of Denmark

[21] Appl. No.: 634,872

[22] PCT Filed: Jul. 6, 1989

[86] PCT No.: PCT/SE89/00387
§ 371 Date: Jan. 8, 1991
§ 102(e) Date: Jan. 8, 1991

[87] PCT Pub. No.: WO90/00578
PCT Pub. Date: Jan. 25, 1990

[30] Foreign Application Priority Data

Nov. 7, 1988 [SE] Sweden .................................. 8802609

[51] Int. Cl.$^5$ .................... C08K 5/56; C08C 19/42; C02F 1/70
[52] U.S. Cl. ............................ 524/398; 524/399; 524/400; 524/413; 525/370; 252/186.33; 252/188.28
[58] Field of Search .............. 524/398, 399, 400, 413, 524/435; 525/370; 252/188.28, 186.33

[56] References Cited

U.S. PATENT DOCUMENTS

| | | | |
|---|---|---|---|
| 4,022,712 | 5/1977 | Noack | 252/188.28 |
| 4,104,466 | 5/1978 | Tsuchida | 252/188.28 |
| 4,127,503 | 11/1978 | Yoshikawa et al. | 252/188.28 |
| 4,384,972 | 9/1985 | Nakamura | 252/188.28 |
| 4,604,270 | 8/1986 | Tom | 252/188.28 |
| 4,836,952 | 7/1989 | Nasu et al. | 252/188.28 |
| 5,021,515 | 6/1991 | Cochran et al. | 252/188.28 |

FOREIGN PATENT DOCUMENTS 0083826 8/1981 European Pat. Off. .
1469396 7/1983 United Kingdom .

OTHER PUBLICATIONS

Chemical Abstracts, vol. 91, (1979) Abstract No. 58055s, Jpn. Kokai Tokkyo Koho 79 38,287.

*Primary Examiner*—Paul R. Michl
*Assistant Examiner*—Peter Szekely
*Attorney, Agent, or Firm*—Ladas & Parry

[57] ABSTRACT

A method of producing a polymer composition adapted to be added to a sealed volume to increase the durability of goods contained in said volume comprising treating a polyamide or copolyamide with a metal compound contained in a volatile solvent composition during refluxing conditions to obtain an active component having capacity to consume oxygen, the metal of said compound being iron, nickel, cobalt, copper or manganese, said active component being a metal complex.

10 Claims, No Drawings

POLYMER COMPOSITION FOR SCAVENGING OXYGEN

FIELD OF THE INVENTION

The present invention relates to a polymer composition adapted for increasing the durability of goods contained in a sealed package, and to a method of producing said composition and to a method of use of said composition.

BACKGROUND

In filled and sealed packages a head-space is provided which is filled with a gas which generally contains oxygen. If the packages are filled with products which are susceptible to oxygen, i.e. which consists of or contain components able to react with oxygen changing the properties or the character of the product, it is important for the contents of the packages to be subjected to the oxygen present in said gas filled space to the least possible extent. In particular, in the case of packages containing dry products susceptible to oxygen, for example, coffee, spices, pharmaceutical preparations in the form of powders or tablets, etc. the ratio between the volume of said head-space (and consequently the amount of oxygen) and the product is often relatively great. Thus, in such cases it is especially desirable to provide a means by which the amount of oxygen present in said head-space can be reduced or eliminated in a simple way which does not interfere with the products contained in the packages. Such means will, of course, also react with oxygen entering the head-space after the package has been sealed, for example, if the package is opened and resealed, or if the package is manufactured of a material which is permeable to oxygen, for example, plastic or paper/cardboard.

An object of the invention is to provide a composition which can be placed into operative association with the head-space of a sealed package so that the product contained in the package will not be affected by the presence of oxygen in the head-space.

In accordance with the invention the composition is effective to reduce or eliminate oxygen present in said head-space. In further accordance with the invention, the composition is placed in a permeable cover, such as a net, a bag or the like, which is included in the package. Especially, the composition is introduced in said gas filled space, i.e. as a rule said head space.

SUMMARY OF THE INVENTION

The invention is based on the finding that certain metal complexes, especially of transition metals, have the capacity to bond with oxygen, and in this way eliminate molecular oxygen from said space, and in the utilization of this effect in connection with polymers.

The polymers comprise thermoplastic resins and especially polyamides and copolyamides, the latter comprising copolymers of polyamides and other polymers. The polyamides can be aromatic and aliphatic, for example poly-m-xylylene-adipamide or nylon 6.6. A preferred group of polyamides are MX nylons. These are polymers containing at last 70 mol % of structural units obtained from m-xylylenediamine alone or a xylylenediamine mixture containing m-xylylene-diamine and p-xylylenediamine in an amount of less than 30% of the total amount and an $\alpha.\omega$-aliphatic dicarboxylic acid having 6–10 carbon atoms.

Examples of these polymers include the homopolymers such as poly-m-xylylene adipamide, poly-m-xylylene sebacamide and poly-m-xylylene speramide, copolymers such as m-xylylene/p-xylylene adipamide copolymer, m-xylylene/p-xylylene pyperamide copolymer and m-xylylene/p-xylylene azelamide copolymer, and copolymers of these homopolymer or copolymer components and aliphatic diamines such as hexamethylenediamine, cyclic diamines such as piperazine, aromatic diamines such as p-bis(2-aminoethyl)benzene, aromatic dicarboxylic acids such as terephthalic acid, lactams such as $\epsilon$-caprolactam, $\omega$-aminocarboxylic acids such as $\omega$-amino-heptoic acid and aromatic aminocarboxylic acids such as p-aminobenzoic acid.

In these MX nylons there may be incorporated polymers such as nylon 6, nylon 66, nylon 610 and nylon 11.

The invention will be explained hereafter in connection with polyamides but it is not limited thereto.

The effect of the polymer composition according to the invention, i.e. its capacity to consume oxygen, is referred to as the "oxygen scavenger" effect or only the "scavenger" effect. It is theorized that a prerequisite for attaining this effect is the formation of an active metal complex, which is only possible if the polymer contains groups and/or atoms having the capacity to coordinate to the metal ion, and the polymer chain or chains are able to achieve a conformation in which the groups and/or the atoms are present in the correct positions in relation to the metal ion. Another prerequisite is that the metal ion which has the capacity to form the active metal complex is present at a location in the molecular structure where the formation of the complex is possible. The metal complex has ligands originating from groups and/or atoms present in the polymer or formed therefrom.

It is believed that the effect of the active metal complex is irreversible in that the coordinating oxygen molecule is converted to highly oxidizing ions, for example, ions of superoxide or peroxide, which react further in the "organic" plastic phase in which they are present.

As to the theory described above, to which the invention is not bound, and which may explain the present invention it may be noted that the theory is rather of academic than of technical interest and that the primary feature is the capacity of the polymer composition to consume (scavenge) oxygen in applications where an environment containing oxygen is detrimental.

According to a preferred embodiment of the invention, polyamides or copolyamides are used together with at least one of the following metal ions; cobalt, nickel, iron, the palladium metals, i.e. ruthenium, rodium, palladium; the platinum metals, i.e. osmium, iridium, platinum; copper or manganese. Among these, iron and cobalt are preferred, and cobalt is most preferred.

Secondary components can be present in the composition of the invention, which are conventional and do not substantially interfere with the scavenging effect. Examples of such components are drying agents, anti-clogging agents, dyes, diluents, fillers etc.

According to another preferred embodiment of the invention the composition is present in the form of particles, such as granules and pellets. Pellets normally as spheres or small cylinders are most preferred, mainly due to their durability.

The size of the particles is not critical but for effective results it is preferably in the range of 0.001–0.05 cm$^3$. The amount of particles in relation to the volume of the head space is a function of the susceptibility of the goods to oxygen degradation and, in general, the volume of particles present in the head space should be between 1 and 50 per cent of the head space volume exclusive of the composition.

A further object of the invention is to provide a method of producing the polymer composition.

In further accordance with the invention, the method comprises treating the polymer, preferably in particulate form, with a metal compound, in dissolved or slurry state in a volatile solvent composition.

In performing the method according to the invention the volatile solvent composition can be a single solvent or a mixture of solvents all of which need not be volatile.

According to a preferred embodiment, the solvent is ethanol, preferably 96% ethanol.

The polymer, which preferably is granulated or pelleted, is refluxed with the metal compound dissolved or suspended in slurry state in the volatile composition for a sufficient time period to form the active oxygen consuming (scavenging) component of the composition. The length of the time period, during which refluxing takes place, is readily determined by one skilled in the art in each case and is not critical according to the invention.

According to still another preferred embodiment of the invention, the metal compound comprises a salt, preferably a halide, and particularly a chloride, of the above discussed metals, and especially iron, cobalt and nickel. These metals, i.e. iron, cobalt and nickel, the palladium metals and the platinum metals are designated as transition metals belonging to series 1, 2 and 3 in the Periodic Table. The choice of the appropriate salt depends on its solubility in the solvent composition in that the time that it takes to prepare the active component is proportionately reduced in relation to higher solubility of the metal salt. The anion of the metal compound can be inorganic, for example, a chloride, or organic, for example an acetate or stearate.

DETAILED DESCRIPTION OF PREFERRED EMBODIMENTS

The invention will be further described below in detail with reference to working examples and experiments conducted to show the oxygen scavenger effect of the composition according to the invention.

EXAMPLE 1

500 g nylon 6.6 ("Ultramid", BASF) in the form of pellets were refluxed for about 24 h with 500 ml of an ethanolic aqueous solution of cobalt chloride ($CoCl_2 \cdot 6H_2O$) at a concentration of 0.24 g/ml. After refluxing during said time period the pellets were dried and the cobalt was found to be present in the amount of 7000 ppm (mean value).

EXAMPLE 2

The procedure of Example 1 was repeated but instead of nylon 6.6 poly-m-xylylene-adipamide was used (a polymer manufactured and sold by Mitsubishi Gas Chemical Co., Japan under the designation "MXD6"). The cobalt content of the dried pellets obtained amounted to 4500 ppm (mean value). By increasing the concentration of cobalt chloride in the solution and the proportion between the amount of solution and the amount of polyamide, pellets of nylon 6.6 having a cobalt content of 15 000 ppm in accordance with example 1 and pellets of poly-m-xylylene-adipamide having a cobalt content of 9000 ppm in accordance with example 2 were prepared. An examination of the dried pellets according to examples 1 and 2 was made which revealed that the polymer was not saturated with metal ions.

EXAMPLE 3

The procedure of example 2 was repeated but with the metal compounds iron chloride and nickel chloride respectively in solution at a concentration of 0.24 g/ml. The polymer was "MXD6". By varying the amount of solution in relation to the amount of polyamide, pellets were prepared having various metal contents.

EXAMPLE 4

The procedure of example 1 was repeated but various salts of metals belonging to the palladium group and the platinum group were used, i.e. ruthenium, rodium and palladium and osmium, iridium and platinum, respectively.

EXPERIMENTS FOR DETERMINING THE OXYGEN CONTENT IN HERMETICALLY SEALED CANS CONTAINING THE COMPOSITION ACCORDING TO THE INVENTION

Pellets comprising nylon 6.6 containing 7000 ppm cobalt prepared in accordance with example 1 and pellets comprising poly-m-xylyleneadipamide containing 4500 ppm cobalt prepared in accordance with example 2 were packed in metal cans (40 g/68 ml can) which were sealed by means of double-seamed metal lids. The size of the pellets was 0.01–0.02 $cm^3$ and the volume of the head-space was 33–35 $cm^3$. Samples were taken from the head-space (one sample per can) immediately after the filling, after two weeks and after 4 weeks for gas chromatographic determination of the oxygen content. The results appear from table I.

TABLE I

| polymer | metal complex | Oxygen content % | | | | | |
|---|---|---|---|---|---|---|---|
| | | imm. after filling | | after 2 weeks | | after 4 weeks | |
| poly-m-xylyene-adipamide | Co | 20.4 | 20.4 | 10.2 | 10.2 | 4.3 | 2.5 |
| nylon 6.6 | Co | 19.5 | 19.6 | 5.9 | 3.4 | 0.3 | 0.3 |

Corresponding samples taken from cans packed with particulate polymers (granulate, pellets) which were conventional and consequently outside the scope of the invention, did not show any change as to the oxygen content in the head-space. The effect obtained by the invention, which clearly appears from Table I can be increased by increasing the metal ion concentration in the polymer and by increasing the contact surface between the polymer composition and the head-space.

What is claimed is:

1. A method of producing a polymer composition adapted to be added to a sealed volume to increase the durability of goods contained in said volume comprising treating a polyamide or copolyamide with a metal compound contained in a volatile solvent composition during refluxing conditions to obtain an active component having capacity to consume oxygen, the metal of said compound being iron, nickel, cobalt, copper or manganese, said active component being a metal complex.

2. A method as claimed in claim 1 wherein said metal compound is a halide of said iron, nickel, cobalt, copper or manganese.

3. A method as claimed in claim 2 wherein the solvent composition comprises ethanol.

4. A method as claimed in claim 1 wherein said polymer is formed as granules.

5. A method of increasing the durability of goods contained in a sealed package having a space filled with gas which may include oxygen comprising operatively associating with said space a metal compound capable of combining with molecular oxygen and consisting essentially of a metal ion having complexing properties and a polymer to which said metal ion is combined as a metal complex, said metal ion being iron, cobalt, nickel, platinum metals, palladium metals, copper or manganese, said polymer being a polyamide or a copolyamide.

6. A method as claimed in claim 5 in which said metal compound is introduced into said space.

7. A method as claimed in claim 6 comprising placing said metal compound in said space in an enclosure permeable to oxygen.

8. A method as claimed in claim 5 wherein said polymer is poly-m-xylylene-adipamide or nylon 6.6.

9. A method as claimed in claim 1 wherein said polymer is treated with the metal compound in amounts for producing said active component with amounts of metal between 4500 and 15,000 ppm.

10. A method as claimed in claim 7 comprising forming said metal complex as granules in which said metal is present in an amount of 4500–15,000 ppm.

* * * * *

UNITED STATES PATENT AND TRADEMARK OFFICE
CERTIFICATE OF CORRECTION

PATENT NO. : 5,194,478

DATED : MARCH 16 1993

INVENTOR(S) : Erik FRANDSEN, et al.

It is certified that error appears in the above-identified patent and that said Letters Patent is hereby corrected as shown below:

On title page,
   Item [30] The correct date for the Swedish priority application 8802609 is -- JULY 11, 1988

Signed and Sealed this

Twenty-eighth Day of December, 1993

Attest:

BRUCE LEHMAN

Attesting Officer      Commissioner of Patents and Trademarks